United States Patent
Castineiras (10) Patent No.: US 8,727,787 B2
(45) Date of Patent: May 20, 2014

(54) METHOD AND APPARATUS FOR FUNDRAISING

(75) Inventor: George A. Castineiras, Farmington, CT (US)

(73) Assignee: Castineiras Companies, LLC, Avon, CT (US)

( * ) Notice: Subject to any disclaimer, the term of this patent is extended or adjusted under 35 U.S.C. 154(b) by 602 days.

(21) Appl. No.: 12/975,928

(22) Filed: Dec. 22, 2010

(65) Prior Publication Data
US 2011/0131091 A1  Jun. 2, 2011

Related U.S. Application Data

(63) Continuation-in-part of application No. 11/867,745, filed on Oct. 5, 2007, now abandoned, and a continuation-in-part of application No. 11/863,931, filed on Sep. 28, 2007, now abandoned, and a continuation-in-part of application No. 11/854,577, filed on Sep. 13, 2007, now abandoned, and a continuation-in-part of application No. 11/652,998, filed on Jan. 12, 2007, now abandoned, and a continuation-in-part of application No. 11/490,726, filed on Jul. 21, 2006, now abandoned, and a continuation-in-part of application No. 11/396,895, filed on Apr. 3, 2006, now abandoned, which is a continuation-in-part of application No. 11/168,651, filed on Jun. 27, 2005, now abandoned, application No. 12/975,928, which is a continuation-in-part of application No. 12/344,678, filed on Dec. 29, 2008, now Pat. No. 8,589,309.

(51) Int. Cl.
*G06Q 10/00* (2012.01)

(52) U.S. Cl.
USPC ........... 434/322; 424/118; 424/323; 424/350; 424/353

(58) Field of Classification Search
CPC ............................... G06Q 10/00; G06Q 30/00
USPC .......................... 434/118, 322, 323, 350, 353
See application file for complete search history.

(56) References Cited

U.S. PATENT DOCUMENTS

| | | | |
|---|---|---|---|
| 2002/0049037 A1* | 4/2002 | Christensen et al. ........ | 455/3.06 |
| 2002/0049816 A1* | 4/2002 | Costin et al. .................. | 709/206 |
| 2002/0069108 A1* | 6/2002 | Aubertin et al. ............... | 705/14 |
| 2002/0111904 A1* | 8/2002 | Gruber et al. .................. | 705/39 |
| 2003/0088455 A1* | 5/2003 | Gruber et al. .................. | 705/10 |
| 2004/0054544 A1* | 3/2004 | Sloot ............................... | 705/1 |
| 2004/0143520 A1* | 7/2004 | Barnum et al. ................ | 705/30 |
| 2004/0254898 A1* | 12/2004 | Parker et al. .................. | 705/402 |
| 2005/0043991 A1* | 2/2005 | Abraham ....................... | 705/14 |
| 2005/0071296 A1* | 3/2005 | Lepkofker ..................... | 705/410 |
| 2009/0121474 A1* | 5/2009 | Hughes .......................... | 283/100 |

* cited by examiner

*Primary Examiner* — Xuan Thai
*Assistant Examiner* — Alvin Carlos
(74) *Attorney, Agent, or Firm* — MKG, LLC (57) ABSTRACT

According to some embodiments, a method and an apparatus are provided to display a webpage comprising a fundraising interface and a selection of interactive games and educational programs, receive an indication of an interaction of a user with at least one of the interactive games and educational programs, and provide rewards associated with the user's interaction with the at least one of the interactive games and educational programs.

15 Claims, 2 Drawing Sheets

METHOD AND APPARATUS FOR FUNDRAISING

CROSS REFERENCE TO RELATED APPLICATIONS

This application is a continuation-in-part of and claims priority to U.S. patent application Ser. No. 11/867,745 filed Oct. 5, 2007, U.S. patent application Ser. No. 11/863,931 filed Sep. 28, 2007, U.S. patent application Ser. No. 11/854,577 filed Sep. 13, 2007, U.S. patent application Ser. No. 11/652,998 filed on Jan. 12, 2007, U.S. patent application Ser. No. 11/490,726 filed on Jul. 21, 2006, U.S. patent application Ser. No. 12/344,678, filed Dec. 29, 2008, U.S. patent application Ser. No. 11/396,895 filed Apr. 3, 2006, and U.S. patent application Ser. No. 11/168,651, filed on Jun. 27, 2005 the contents of which are incorporated herein by reference in their entirety for all purposes.

BACKGROUND

Institutions such as schools, churches, charities, affinity groups and the like often use fundraising activities to generate the capital needed to offer services or even to continue in existence. These activities typically require a great deal of planning and time to implement. In addition, they are usually "one-time" activities wherein a continuous revenue stream stemming therefrom is not realizable. In addition, these fundraising activities often have limited appeal to large population segments. Moreover, they can be logistically cumbersome as the items sold are sometimes perishable and must be gathered in a common location for distribution or to be picked up.

SUMMARY

According to aspects illustrated herein, there is provided a method and an apparatus to display a webpage comprising a fundraising interface and a selection of interactive games and educational programs. An indication of an interaction of a user with at least one of the interactive games and educational programs is received. Moreover, rewards associated with the user's interaction with the at least one of the interactive games and educational programs are provided.

According to other aspects illustrated herein, there is provided a kit for the creation of custom postage including one or more artforms having an areal portion upon which a user can create original artwork, to be displayed on the custom postage. The kit includes an order form for ordering a quantity of the custom postage, shipping receptacles for forwarding one or more of the artforms having the original artwork thereon, and completed order forms, to a facility for processing orders for the custom postage. The kit also includes instructions for use of the kit including instructions directed to creating the original artwork and for completing the order form. Materials for creating the original artwork are also provided in the kit, and include inkpads, crayons, colored pencils, markers, paints, paint brushes, charcoals, pastels, tape, glue, stamps, scissors, rulers, jump starts and combinations thereof.

According to other aspects illustrated herein, a method for conducting a fundraiser includes soliciting or receiving an inquiry regarding the conduct of a fundraiser wherein customized pre-paid postcards are offered as part of the fundraiser. One or more images to appear on the postcard unique to an entity for which the fundraiser is being conducted and/or unique to one or more participants in the fundraiser. An electronic version of the images are stored in a database. Software is associated with the database, which is operable to perform storing, tracking, and/or manipulating information relevant to the fundraiser. The method also includes receiving orders for the postcards, printing the postcards having the image thereon and forwarding the postcards to the entity for which the fundraiser is being conducted and/or an entity from which an order was received.

According to other aspects illustrated herein, a method for memorializing creative works includes a facilitating entity soliciting or being solicited by an organization wishing to conduct a program on a regular basis whereby participants' creative works are memorialized via the creation of commemorative prints. An organization is provided instructions regarding the conduct of the program. The creative works are received in either electronic or non-electronic format. If the creative works are received in a non-electronic format, the creative works are converted to an electronic format. The creative works and other information relevant to the participants, the organization and the program, are stored in an electronic format in a content database. The content database is operable to associate the stored creative works with the other information. Orders are received for the commemorative prints and the commemorative prints are generated from the creative works stored in the content database. The commemorative prints are distributed to the participants, purchasers of the commemorative prints and/or the organization.

According to other aspects illustrated herein, a method for conducting a fundraiser includes soliciting or receiving an inquiry from an organization regarding offering one or more customized items as part of a fundraising event conducted on behalf of the organization. A database is established for performing tracking, manipulating and/or storing therein, information relevant to the fundraising event. The database has software associated therewith for manipulating the information stored in the database to generate desired outputs. Instructions are provided to the organization regarding the manner in which the fundraiser will be conducted. Images relevant to the organization are displayed on the customized items. The organization is provided with one or more of the images for approval thereof. The organization is provided with viewing means by which the at least one customized item having the images displayed thereon can be viewed. The viewing means are unique to the organization and accessible only via notice from or on behalf of the organization. Orders and payment for the customized items are received and payment instructions are processed. The database is populated with some or all of the information relevant to the received orders. The orders are fulfilled and delivered to the purchasers.

According to other aspects illustrated herein, a method for offering custom postage as part of a fundraising event includes providing a computer programmed to establish a database for storing data, the computer including programming to enable the computer to manipulate data in the database. An inquiry is received from, or on behalf of, an organization regarding offering custom postage as part of a fundraising event. The fundraising event is established. Initial information is collected from the organization and the initial information is stored in the database. The software based programming causes the computer to generate a unique organization identification code and to associate the unique organization identification code with the initial information stored in the database. The software-based programming causes the computer to extract relevant information from the database and to generate artforms upon which participants in the fundraising event can create artwork and the artforms having the unique organization identification code associated therewith. A plurality of the artforms are distributed to the organization and thereby to the participants. Payment information relevant to purchasers of the custom postage is received and processed. Images of artwork from a plurality of the artforms are entered into the database, the artwork having been provided by the participants. Information relevant to the orders and information identifying each of the participants is also entered into the database. The software-based programming causes the computer to cause the images of the artwork, the information relevant to the orders and the information identifying each of the participants, to be associated with one another and with the relevant organization identification code. The software based programming causes the computer to generate a unique participant identification code for each participant and to associate the participant identification code with, the information stored in the database relevant to the participant, and with the relevant organization identification code. The software-based programming causes the computer to manipulate the data stored in the database to generate printing information for the custom postage. The printing information is used to print the custom postage and ship the printed custom postage to the purchasers thereof.

DETAILED DESCRIPTION

In a first embodiment, the present invention is directed to a method for conducting a fundraiser whereby inquiries are received by, or solicited from, an organization regarding offering at least one customized item as part of a fundraising event conducted on behalf of the organization. A database is maintained for tracking the solicitation or inquiry. Information resident in the database relevant to the fundraiser can be tracked, manipulated and/or stored therein via software associated with the database. Preferably this software can also be employed to extract information from the database to generate desired outputs. For example, at the conclusion of the fundraiser, a portion of the proceeds will be due the organization. The software associated with the database can be used to extract the information therefrom relevant to the amount due the organization and can be employed to generate a report pertaining thereto. Moreover, the database may be established and/or managed by the facilitating company or a third party acting on behalf of the facilitating company. In addition, at the conclusion of a fundraising event, the organization conducting the fundraiser may retain the portion of the collected funds due it and forward the remainder to the facilitating company or an entity designated by the facilitating company. Similarly, the organization conducting the fundraiser can collect all of the payments from purchasers of the customized items and present the facilitating company with a single reconciled payment. This reconciled payment can be in the form of any of the above-described payment instructions. Moreover, the organization conducting the fundraiser may or may not withhold the amount due it.

Once the organization has agreed to conduct a fundraiser, instructions are provided to the organization. At least one image relevant to the organization is created, by or at the behest of the company facilitating the fundraiser for display on the customized items. Preferably several images are created so that the organization can have a broad selection of images to choose from. Each of the images created will have significance relevant to the organization for which the fundraiser is being conducted. For example if the organization is an affinity group, such as an alumni association, the images may include scenes of the relevant university campus or buildings thereon. The images can also include logos or sports team images relevant to the university. However, the present invention is not limited in this regard as other images relevant to the particular organization such as, for example, images of distinguished or famous past or present members of the organization, can be created without departing from the broader aspects of the present invention. Once the images are created, the organization chooses one or more of the images for inclusion on the customized items.

The above-described customized items can include such things as custom postage, custom note cards, checks (e.g., checks for personal and/or business checking accounts), return labels, mugs, key chains and the like, each bearing at least one of the images thereon. In addition, the customized items can also include wrapping paper. The wrapping paper would include one or more of the images printed thereon.

Viewing means unique to the organization and accessible via notice therefrom or on behalf thereof, are provided by which at least one customized item having the at least one image displayed thereon can be viewed by the organization. In the first embodiment, the viewing means includes a web page having an URL unique to the organization. The webpage can also be protected via security protocols, such as, but not limited to, a password. In addition to being able to view the custom items on the webpage, a user accessing the page may also be able to make choices with respect to colors or patterns to be included on the custom items. For example, where a user is purchasing customized wrapping paper, via the webpage or links included thereon, a user or prospective purchaser may be able to choose a theme, color scheme, pattern, and the manner by which the images will be displayed on the wrapping paper. In the first embodiment, once the webpage is established the facilitating company either notifies the organization which then contacts those participating in the fundraiser, or the facilitating company, based on a list provided by the organization, will contact the participants in the fundraiser advising them of the manner by which the webpage can be accessed.

Orders for the customized items are received by the facilitating company, preferably by placing the orders electronically via the webpage at which the custom items are viewed. Ordering information may be accessible directly on the webpage or via a link to an ordering page, the link being on the webpage at which the custom items are viewed. While electronic ordering has been described, the present invention is not limited in this regard as other ordering means can be employed, such as, ordering via the mail, fax or telephone. Moreover, while electronic ordering information via the webpage, or a link on the webpage where custom items can be viewed has been described, the present invention is not limited in this regard as orders may be placed electronically via a wholly separate webpage or website that is not accessible via a link on the webpage where the custom items are viewed.

In addition to ordering custom items in the above-described manner, payment information and order information regarding which, and the quantity of customized items ordered must also be ultimately transmitted to the facilitating company. Payment information/instructions is received and processed by the facilitating company or another entity on behalf of the facilitating company. These payment instructions can take several different forms. For example, payment may be made electronically by credit or debit card by entering the relevant information into a payment section of the above-described webpages or via a separate payment webpage. The credit or debit card information along with the ordering information is then forwarded to the facilitating company for processing. Payment information can also be processed by accessing an internet payment system, such as, for example, Paypal®. While electronic payment has been described, the present invention is not limited in this regard, as payment may also be made by cash, checks or money order or via credit or debit card with the credit or debit card information being transmitted by fax, mail, e-mail, or the like.

Subsequent to, or simultaneously with the placement of an order, the above-described database is populated with information relevant to the received orders. The database may be populated manually or directly if the orders are placed electronically. If the database is populated directly, it may be necessary for the software associated with the database to operate to facilitate the population thereof. The order information entered into the database may include such things as the name of the person placing the order, the type and number of custom items ordered, the organization for which the particular fundraiser is being conducted, the method of payment and the shipping address to which the custom items are to be sent.

Once the necessary information is received, the orders are fulfilled and the custom items sent to the purchasers thereof. Upon completion of the fundraiser, the facilitating company calculates, either manually or by employing the software associated with the database, the percentage of the proceeds that are due to the organization and once calculated forwards the funds to the organization. In addition, a portion of the proceeds from the fundraiser may be allocated to a scholarship or other type of assistance fund. For example, a fund used to defray medical expenses of the members or others designated by the organization conducting the fundraiser may be established. This fund may be managed by the facilitating company or another organization.

The software associated with the database can have the ability to manipulate the information in the database to generate desired outputs. For example, financial reports, demographic reports, and the like may be generated. The term "associated" used herein with respect to the phrase "software associated with the database" should be construed to mean software that is in communication with the database or upon use can communicate with the database to manipulate information stored therein or to facilitate the storage of information therein.

In an embodiment of the present invention, custom postage, customized checks, and/or customized mailing labels are offered as part of a fundraising event. Initial information is collected from the organization and stored in the database. The initial information can include such things as the organization's name, address, phone number, e-mail address and the name of a contact person within the organization. However, the present invention is not limited in this regard as other or different information may also be initially requested without departing from the broader aspects of the present invention.

Upon receipt of the initial information a unique organization identification code is established and associated with the initial information stored in the database. The organization code can be generated by the software associated with the database automatically upon entry of the initial information into the database. The organization code may also be established manually and manually associated with the relevant information stored in the database. The organization identification code can be random or be as straightforward as the organization's name.

Once entered, information is extracted from the database and used to generate artforms upon which participants in the fundraising event can create their own unique artwork, for example custom artwork such as but not limited to drawings. The artforms are preferably made from paper with a portion of the form delineated as the area of the artform on which the original artwork or custom artwork is to be created. The organization identification code is associated with the artforms, preferably in the form of a bar code printed directly on the artforms. However, the present invention is not limited in this regard as other indicia such as, for example, a form number, can be associated with the organization code without departing from the broader aspects of the present invention. Once generated, a plurality of the artforms is distributed to the organization and thereby to the participants in the fundraising event. It may not be necessary for the facilitating company to generate the artform as they may also maintain a stock of the artform on hand. In such instances and as described above, it may only be necessary to associate a number or other indicia on the artform with the organization code. However, the present invention is not limited in this regard as there may also be no need to associate the particular artforms with the organization prior to their distribution. Alternatively, the artform may be forwarded directly to the participant via mail or e-mail. In addition, the artform may be resident on a webpage dedicated to the particular organization and downloadable therefrom.

Once the participants in the fundraiser are in possession of the artforms, the participants produce the original artwork or custom artwork thereon, preferably by drawing onto the artform. However, other materials, such as, but not limited to stickers materials "cut-out" from other sources, may also be placed on the artforms. Once the original artwork or custom artwork is completed, participants solicit orders for custom postage, custom checks, or mailing labels, bearing the participant's artwork thereon. Purchasers may also have the option of soliciting orders for other customized items, bearing images of the relevant artwork, such as note cards, key chains, signs and the like. Conversely, images of the custom postage, custom checks, or mailing labels, bearing the participant's artwork thereon may be posted on a webpage for viewing by potential purchasers. Preferably, the webpage is unique to the particular organization conducting the fundraiser and accessible via password or other security protocol generated by the facilitating company and disseminated to prospective purchasers by or on behalf of the organization conducting the fundraiser. While the dissemination of the above-described password has been described as being accomplished by the organization conducting the fundraiser, the present invention is not limited in this regard as the facilitating company; pursuant to information concerning prospective purchasers provided to it by the organization may also notify the prospective purchasers with respect to how to access the appropriate webpage. While the webpage has been described as being unique to the organization, it may in addition, be unique to the particular individual's artwork. Accordingly, an organization may have a plurality of unique web pages and URL's associated therewith, each being relevant to the particular organization and/or fundraiser and to a particular participant's artwork.

The artforms and information relevant to any solicited orders as well as information identifying each of the participants is collected and forwarded to the company facilitating the fundraising event or another entity designated by the facilitating company. In the preferred embodiment of the present invention, the original artwork and ordering information are embodied in the artforms. However, the present invention is not limited in this regard as information relevant to solicited orders can reside somewhere other than on the artform. For example, a separate order form can be utilized.

Once the artforms and ordering information are received, payment information relevant to purchasers of the custom postage is extracted from the ordering information and processed. Where web pages are employed for placing orders, credit or debit card information may be entered electronically via the particular webpage or an order entry page linked to the webpage. This information is then processed by the facilitating company and if any problems occur in processing a payment, the payer is contacted and the situation resolved. In addition, the organization can collect all of the payments from potential purchasers and issue one reconciled payment to the facilitating company. If this system of payment is employed, orders may be placed via the above-described web pages. In such an instance, the organization can be provided from the facilitating company with an accounting of the amounts owing and from whom. The organization can then, as described above, forward a reconciled payment to the facilitating company in any of the above-described manners.

In addition, when the artform and any other material are received, at least a portion of the information contained on the artform and other materials may be entered into the database. Each piece of artwork is scanned and along with information relevant to the orders as well as information identifying each of the participants, is entered into the database. A substantial portion of this information associated with the relevant organization identification code and a unique participant identification code for each participant is created and associated with the information stored in the database relevant to the participant, as well as with the relevant organization identification code. However, the present invention is not limited in this regard as a unique participant identification code is not required to enable this particular embodiment. Printing information for the custom postage, custom checks, and or customized return labels, bearing the participants artwork is generated and used to cause the customized item(s) to be printed. Once printed, the customized item(s) is shipped to the purchasers thereof.

While images created by participants in the fundraiser have been described as being printed onto checks and mailing labels, the present invention is not limited in this regard. For example, where the organization is an affinity group, images relevant to the particular affinity group may be created, as described above, by the facilitating company. These images, once approved by the affinity group, can then be printed onto customized items including checks, mailing labels, note cards and the like.

In another embodiment, the above-described images created on behalf of an affinity group can take the form of paintings or photographs created at the behest of the facilitating company. In addition signed images by prominent figures such as sports figures, famous alumni and the like, can also be provided. The originals, or copies, such as posters or lithographs can also be offered as part of the fundraiser, as can commemorative plaques incorporating the images. In addition, the present invention contemplates these items being auctioned off on line either at a web site or web page established by or on behalf of the organization, or at an on-line auction site such as, but not limited to EBAY®.

Where original artwork and custom artwork are created by the participant in the fundraising event as described above, this artwork can also be offered to prospective purchasers in the form of prints or posters. Moreover, commemorative plaques and/or collages or compilations of the artwork may also be offered including things such as calendars incorporating the artwork.

The present embodiment also contemplates designating selected original artwork as embodied on custom postage as collectable. Submitted artwork would be reviewed by the facilitating company or by designers of the facilitating company. If a fundraiser participant's original artwork is selected, custom items, including custom postage would be designated as collectable and offered for sale to the general public. The organization that originally conducted the fundraiser relevant to the particular selected piece of original or custom artwork will then receive a portion of the proceeds of the sales to the general public. In addition, the artist responsible for the original or custom artwork will be eligible to receive a scholarship.

In another embodiment, once an organization commits to conducting a fundraiser whereby the above-described artforms are employed, barcodes are placed on preprinted artforms. Preferably, the barcode has 15 digits that pertain to the following information. Four digits forming part of the barcode correspond to an identification number unique to the organization conducting the fundraiser. Two digits forming part of the bar code identify the particular state that the organization or the fundraiser are located in. Four digits corresponding to the particular bar code identify the relevant year, and the last five digits identify the number of the particular artform. While a particular sequence and number of digits has been described as forming the barcode, the present invention is not limited in this regard as the number of digits, their order, and what they pertain to can be changed without departing from the broader aspects of the present invention.

Once an artform is completed and submitted to the facilitating company, the barcode is scanned by conventional means. The scanned information extracted from the barcode identifies the artwork on the particular artform, the organization, the location and date(s), and the consumer and ties all of this information together. The scanned information can, via the software associated with the database, be transferred and stored directly in the database, and subsequently reviewed for accuracy, or the scanned information can first be subject to review for accuracy and then be input into the database.

In still another embodiment, customized wrapping paper can be offered as part of the fundraising event. The wrapping paper can include images of the original or custom artwork thereon, personal photographs, combinations thereof, and the like. In addition, the wrapping paper can have various different themes, color schemes and patterns associated with it. These may be selectable by the purchaser.

In the above-described embodiments wherein the images are posted on a website accessible by potential purchasers of the customized items, wrapping paper images can also be displayed thereon or be accessible via a link therefrom. Once the wrapping paper images are available to the prospective purchaser, several different options may be available to customize the wrapping paper. For example, different patterns and/or color schemes for the wrapping paper may be selectable. Moreover, the prospective purchaser may be able to select the manner in which the images and/or artwork appear on the wrapping paper. In addition, the wrapping paper incorporating predetermined images and/or original or custom artwork, or a combination thereof, may also be thematic in nature. For example, the wrapping paper could have a theme and patterns thereon indicative of a holiday, such as Christmas. In addition, the theme could be relevant to a particular event such as a birthday or anniversary. Accordingly, the prospective purchaser may wish to procure more than one type of wrapping paper, customized to have one or more desired images thereon.

In addition to original and custom artwork, the custom wrapping paper can bear images selected from a gallery of images provided by the facilitating company. These images may be accessed from a webpage accessible by a prospective purchaser. Where original and custom artwork is being displayed thereon, more than one piece of artwork may be placed on the wrapping paper. For example, it may be desirable to have the artwork of two or more siblings displayed on the wrapping paper.

In addition, the present embodiments also contemplate incorporating other images such as photographs into the wrapping paper. For example, where a school is conducting the fundraiser, a child's school picture, alone or in combination with a class picture or other picture may be incorporated into the wrapping paper. In this instance these pictures would preferably be supplied to the facilitating company in electronic format for incorporation into the wrapping paper. However, the present invention is not limited in this regard as the photographs can also be provided to the facilitating company or entity acting on behalf of the facilitating company who then would convert them into an electronic format. Preferably, the images as well as the wrapping paper themes, patterns and color schemes will be internet accessible in the above described manner. However, the present invention is not limited in this regard as the wrapping paper themes, patterns, color schemes and images for incorporation thereon can be manually selected without and forwarded to the facilitating company for production.

In another embodiment, the artform is created by the fundraiser participants on-line. In this instance, the creator of the artwork, or if the creator is a child, or not computer literate, someone on behalf of the creator accesses a webpage established to provide instructions for and to facilitate scanning the artwork onto an on-line artform. Once the relevant webpage is accessed, the appropriate barcode, previously provided to the creator, is typed into an area provided on the webpage. The creator or other person is then walked through, via on-line instructions, the process of scanning the artwork from their home or other location. Once the artwork is scanned into the relevant webpage the creator or other person will also be able to, via online instructions, customize the particular item or items he/she wishes to order. For example, if custom postage is being ordered, the purchaser will be able to, on-line, change certain colors on the postage. In addition, the custom postage can be provided in landscape or portrait formats, with or without text. The custom postage can be of any suitable size (e.g., small, medium and/or large) and/or denomination. If custom checks or mailing labels are ordered, the person may have the option of selecting different check or label backgrounds fonts and/or print colors. Similar modifications may also be made to other custom items offered as part of the fundraiser.

In still another embodiment, gift cards are offered as part of the fundraising event or as an item for purchase after the fundraising event. The gift cards can be purchased in predetermined amounts, such as, but not limited to $25 or $50. Similarly, the gift card can be encoded with any amount.

Each gift card has a number or code printed thereon. This code is unique to one or both of a particular organization or an individual participant in a fundraiser. Where the organization is an affinity group, the code is unique to the particular group. Where the organization is a school, the code may be unique to the particular participant in the fundraiser.

These gift cards may be offered as part of the fundraiser or after the fundraiser is over. The gift cards may have a finite period of usefulness, corresponding to a period of time for which customized items bearing a particular image are available.

In practice, the gift cards can be ordered either via a webpage unique to a particular organization or containing ordering information unique to one or more particular individuals. The gift cards bearing a number associated with a particular organization and/or individual are forwarded to the purchaser.

Once received, the purchaser accesses a particular web page identified on the gift card or on instructions supplied with the gift card. The purchaser then enters the code on the gift card and is directed to a webpage whereon customized items associated with the code on the gift card can be viewed and purchased using the card. While the present embodiment has been described wherein the gift card is used to purchase customized items associated with the barcode on the gift card, the present invention is not limited in this regard as other custom items separate from those associated with the code on the gift card can also be purchased without departing from the broader aspects of the present invention.

The information relevant to each gift card, such as, but not limited to, purchaser name and address, relevant organizations and/or image, and/or individual are stored in the database. This information can be stored directly to the database via software associated therewith or the information can be manually entered into the database. When a purchase is made using a gift card, the database is updated either manually or automatically to reflect what was purchased and to adjust the dollar amount, if any, left on the gift card.

In another embodiment, a method for conducting a fundraiser is described. In addition, the present embodiment also contemplates incorporating other images such as photographs into the wrapping paper and/or gift bags. For example, where a school is conducting the fundraiser, a child's school picture, alone or in combination with a class picture or other picture may be incorporated into the wrapping paper and/or gift bags. In this instance these pictures would preferably be supplied to a facilitating company in electronic format for incorporation into the wrapping paper and/or gift bags. However, the present embodiment is not limited in this regard as the photographs can also be provided to the facilitating company or entity acting on behalf of the facilitating company who then would convert them into an electronic format. Preferably, the images as well as the wrapping paper and/or gift bag themes, patterns and color schemes will be internet accessible in the above described manner. However, the present invention is not limited in this regard as the wrapping paper and/or gift bag themes, patterns, color schemes and images for incorporation thereon can be manually selected and forwarded to the facilitating company for production.

The present invention resides in another aspect in supplying prepaid postage postcards bearing the above-described original and custom artwork thereon. The artwork can be enlarged and cover a substantial portion of a surface of the postcard or it can be of a size akin to a postage stamp and positioned on the postcard where a stamp would normally be placed. The postcards can be supplied as part of a fundraising event in lieu of, or in addition to the above-described custom postage.

Preferably, the fundraising event would be conducted as described herein; however, the present invention is not limited in this regard. This embodiment of the present invention contemplates that more than one original and/or custom artwork image can be printed onto a postcard. For example, where a participant has created more than one piece of original artwork, these images can be printed onto the postcard. Moreover, the present invention contemplates two or more persons collaborating to create original or custom artwork. The same postcard could include images of the collaborative artwork.

Moreover, the present invention further contemplates incorporating an image or photograph of the artist along with an image of the original or custom artwork he/she created, on the postcard. While an image of the artist has been described, the present invention is not limited in this regard, as other images or photographs may also be employed. For example where the fundraiser is directed to raising money for an individual medical expense, a photograph of the recipient may be provided. Another example could be when a fundraiser is used to raise money for a scholarship bearing an individual's name; a photograph of the individual can be included on the postcard along with other original or custom artwork.

Where the fundraising event is being conducted on behalf of an affinity group, the postcard can contain more than one of the above-described images relevant to the organization. In addition other images such as photographs or portraits of past, present or prominent members of the affinity group can also be incorporated into the post card.

In another aspect of the present invention, gift-to-donation program is contemplated. In exchange for a charitable contribution, a donor can be given an amount of custom postage. The custom postage can incorporate images created on behalf of an affinity group as described above. The custom postage can also include original or custom artwork created in the above-described manner. The images on the custom postage can also include logos of such things as universities, clubs, sports team and the like.

The particular organization offering the custom postage in exchange for the charitable contribution can do so by pre-purchasing a quantity of the custom postage and, for example, can give a predetermined quantity of custom postage for a particular donation amount. Instead of having a quantity of custom postage on-hand, the particular organization upon receiving a sufficient donation can advise the company producing and/or facilitating the production of the custom postage, to ship a quantity of custom postage to the organization. The donor may be given a choice of images to be printed onto the custom postage. The donor depending on the applicable tax laws, may be able to take a tax deduction on all or a portion of the donation.

In addition to the foregoing, the present invention further contemplates that all or a substantial portion of the above-described donation process can be accomplished electronically. The donor can access a website to make their donation to a respective organization via a credit or debit card, or electronic funds transfer. Once the donation is made, custom postage relevant to the particular organization can be automatically sent to the donor. If there is a choice of images or original or custom artwork that can be printed onto the custom postage, the donor can access this information on the website, make his/her choice of images and then the chosen custom postage can be forwarded to the donor. In order for the donor to access the website to make a donation, the donor can be required to give certain identifying information by entering the information into the appropriate places in the website. This information can be stored in a database along with information relevant to the organization to which the donation was made. The stored information can later be used by the organization to track donors and donations, to contact donors when funds are needed, and the like.

The present invention also resides in a social citizenship program wherein fundraising is conducted on behalf of organizations that provide monetary or other aid to people, populations, or segments of populations in need of financial or other aid. The entity conducting the fundraiser can be a school, church or other entity. The participants, typically children, create original or custom artwork as described above; the or custom artwork can be relevant to the particular cause for which funds are being raised. However, the present invention is not limited in this regard as the artwork can simply be unique to the individual. The original or custom artwork would be created as set forth above and converted into an electronic format, or created electronically. Participants in the fundraiser, once their artwork is created could solicit orders for custom postage in the manner described herein above. In addition, the company facilitating the fundraiser can also establish a website or web page accessible via a website through which custom postage or other items bearing artwork can be ordered with at least a portion of the proceeds being donated to the charity.

This embodiment of the present invention also contemplates selecting one or more original or custom artwork images to appear on custom postage, the images being relevant to the particular cause for which the fundraiser is being conducted.

In another aspect of the present invention, the facilitating company will establish a website having entertainment and educational components thereto. Access to the website will be allowed upon registration of an original or custom artwork image to be converted into custom postage. However, the present invention is not limited in this regard as access to the website may be gained in other manners, such as, but not limited to being listed or registered as a participant in a fundraising event, the participant/registrants identifying information being stored in the above-described database.

Regardless of the manner in which the website is accessed, or the security protocols employed, access will be secure for minors. In order to provide such security, a minor's parent or guardian can be required to provide their e-mail address. The parent's or guardian's e-mail address will be associated with the relevant minor's information so that the parent or guardian can be copied on e-mails sent via the website, by or to the minor. In addition, the present invention also contemplates the website being monitored by at least one of the facilitating company, the website host and the parents or guardians of one or more of the minors accessing the website. Mechanisms for reporting suspicious or undesirable behavior will be in place to prevent or limit minors from being subjected to inappropriate content.

Once an individual qualifies, access to the website can be gained in several different manners. For example, the individual can be e-mailed a username and a password that upon accessing the website, must be entered to go further. It should be understood that as used herein, the term individual should be broadly construed to mean a participant/registrant's parent or guardian if the participant/registrant is a minor. In addition, other security measures such as hashing, answering questions unique to the individual, and the like may also be employed. An individual may also be given the ability to change their username and password. While having a username and password e-mailed to an individual has been described, the present invention is not limited in this regard as a username and password can also be sent to an individual via regular mail, fax, or via telephone. In lieu of a username and password an individual may be forwarded a code that can be entered once the individual enters the website. Upon entering the code, the user can either gain access to the website and/or be required to establish a username and a password.

Access to the website may also be allowed via the registration of virtual custom postage. For example, custom postage may have been previously created as part of a fundraiser. This custom postage can be registered on the website thereby allowing the registrant access thereto.

The website may include any number of interactive games and educational programs with one focus of the website being the promotion of literacy. Accordingly, the games and programs may be directed to enhancing reading or mathematical skills, however, the present invention is not limited in this regard. It is also contemplated that interacting with the programs or playing the games can earn the user points which can be accumulated and redeemed for such things as access to other areas of the website, redemption for web-related virtual items, or discounts on merchandise being offered on the website or by others advertising on the website or otherwise associated therewith. With respect to web-related virtual items, a user of the website may be given access to an area of the website unique to the particular user, for example, but not limited to, a virtual room. The user can redeem points to buy virtual items to furnish, and/or decorate, his/her virtual room. Access to the website can also be dependant on a user's performance in school. In addition, it is also contemplated that a user can gain points based on achieving certain grades on a report card. In addition, use of the website can provide the means whereby users qualify for regional and/or national scholarships. The use of the website can also allow users to obtain credits toward tuition at participating institutions.

One manner in which the website promotes literacy is via the establishment of a penpal system. In one embodiment of the penpal system, participants would register their original or custom artwork and the virtual state in which they reside. The original or custom artwork would be viewable in the form of a piece of custom postage. One objective of the penpal system being, as will be explained in greater detail below, for a participant to collect custom postage images from all fifty states in the United States. A participant collects these images by accessing an area of the website that contains other participant's custom postage images and the states with which the images are associated. The participant then chooses, by, for example, clicking on an image, another participant's piece of custom postage. By choosing the image, the user is then able to draft an e-mail to the author of the chosen image. Software associated with the penpal system then evaluates the e-mail to verify that the e-mail meets certain criteria imposed by the software. These criteria can include such thing as, but are not limited to, checking grammar and spelling, determining that the e-mail meets a minimum word count, that the e-mail does not use abbreviations and verifying the appropriateness of the content of the e-mail. Once it is determined that the e-mail message meets the set criteria, the e-mail message is then sent to the desired recipient. Once the e-mail is sent, the sender will be given credit for the particular state with which the recipient is associated. The sender may view the states with which he/she has been given credit for by accessing a page or other area on the website where the custom postage images corresponding to the credited states can be viewed. As the user accumulates credit for different states, rewards can be given to the user. These rewards can be given for such things as, the most stamps collected, the largest geographic area covered. These rewards can include such things as, but not limited to, discounts on merchandise, or qualification for a scholarship.

The present invention also contemplates providing a type of virtual auction on the above-described website. A user would enter his custom postage into the virtual auction along with others. Users could then vote for their favorite custom postage. The auction could be categorized with user's voting for their favorite custom postage within a particular category.

The present invention also contemplates the creation of awards and/or scholarships (hereinafter referred to collectively as scholarships) to be awarded at predetermined intervals, such as but not limited to, annually. The criteria for receiving the scholarships are set by the company and may be administered and evaluated by independent entities. For example, a number of top selling participants in a given area, district, or nationwide, may be chosen as qualifying for a scholarship. A number of independent judges will then evaluate the artwork submitted by each scholarship contender and chose which should receive the scholarships.

In addition to scholarship programs, commemorative awards and/or plaques incorporating the participant's artwork and custom postage may be offered. In addition, and in cooperation with the United States Postal Service, a number of pieces of artwork chosen based on particular criteria such as artistic content can be incorporated into United States postage stamps.

In addition to the rewards discussed thus far, the present invention also contemplates user's gaining the ability to access sites advertised on the facilitating company's website. The advertiser's would provide user's who have earned rewards with discounts to their services and/or merchandise.

The e-mail addresses associated with the pen pal system can be provided by any service provider, or they can be provided by or on behalf of the facilitating company. If provided by or on behalf of the facilitating company, the individual given the e-mail address may be required to meet certain criteria to ensure that it is appropriate that they be given an e-mail address. These criteria can include such things as, but are not limited to, age verification, providing social security numbers, verification from the organization conducting a fundraiser that the person is actually a participant.

In addition to gaining an e-mail address in association with the above-described pen pal system, the present invention also resides in providing e-mail addresses to users for a fee. The e-mail service would provide users with a safe environment whereby only other subscribers of the service could be e-mailed. Prior to being given an e-mail address, a user would have to be qualified. The qualification process may include such things as, but is not limited to age verification, obtaining parental permission, acceptable academic performance, recommendations from teachers or school administrators, and the like. The present invention also contemplates allowing users to e-mail subscribers to other sites or services provided that these sites or services meet criteria that safeguards are in place to ensure a safe environment for users. These safeguards can include such things as, but are not limited to, monitoring of e-mails for appropriate content, monitoring e-mails for the use of certain words, and the like. In addition to e-mail, instant messaging can also be provided.

Because one of the objectives of providing e-mail access is to promote literacy, e-mail messages may have to meet certain criteria before they can be sent. For example, a minimum word count can be imposed. In addition, lists of vocabulary words can be provided and if used, rewards can be given, or the user could be prevented from sending e-mails that do not contain one or more of the vocabulary words. In addition, the use of abbreviations may also be prevented. The amount of time a particular user can spend on the website or e-mailing others may be limited. The website may also include additional security protocols wherein a parent or guardian, or other authorized person can be required to enter a password in addition to the user's password. Prompts requiring the entry of the additional password can also appear on the screen. These prompts can include such things as inquiring whether a user has done his/her homework and requires an e-mail from a parent or guardian validating the user's response.

It is further contemplated that the above-described website includes advertising thereon. The advertising would have to be appropriate to the website. The advertising can be in the form of a banner ad, a pop-up advertisement, or a link to the advertiser's website. However, the present invention is not limited in this regard as the advertising may also be accessible via a links page on the website whereby a user can choose what advertisements to access. Any advertising or listings on the website would be appropriate to the content and theme of the website.

Access to the above-described facilitating companies' website can be free with the registration of new custom postage each year, and/or a fee can be charged for yearly registration.

In another embodiment, the present invention is directed to a method for conducting a fundraiser whereby inquiries are received by, or solicited from, an organization regarding offering at least one customized item as part of a fundraising event conducted on behalf of the organization.

The organization can also provide the above-described customized items in exchange for a donation thereto. The donor may be able to write-off 100% of the donation, within Internal Revenue Services guidelines, as a tax deduction. In addition to the images described above, the donor may also be allowed to create or otherwise provide his/her own image in the manners described herein for inclusion on the custom items.

In addition, the present invention also contemplates incorporating other images such as photographs into the wrapping paper and/or gift bags. For example, where a school is conducting the fundraiser, a child's school picture, alone or in combination with a class picture or other picture may be incorporated into the wrapping paper and/or gift bags. In this instance these pictures would preferably be supplied to the facilitating company in electronic format for incorporation into the wrapping paper and/or gift bags. However, the present invention is not limited in this regard as the photographs can also be provided to the facilitating company or entity acting on behalf of the facilitating company who then would convert them into an electronic format. Preferably, the images as well as the wrapping paper and/or gift bag themes, patterns and color schemes will be internet accessible in the above described manner. However, the present invention is not limited in this regard as the wrapping paper and/or gift bag themes, patterns, color schemes and images for incorporation thereon can be manually selected and forwarded to the facilitating company for production.

While the above-described embodiment envisions the art forms, and thereby the artwork being scanned (converted to electronic format) subsequent to receipt, the present invention is not limited in this regard. The art forms can also be scanned by the artists, by someone on behalf of the artists, or by the organization and the scanned images forwarded electronically to the facilitating company. The artwork can also be created electronically. The present invention contemplates that the artwork can be created on an electronic version of the art form or in any other electronic format.

The present invention also contemplates designating selected original or custom artwork as embodied on custom postage as collectable. Submitted artwork would be reviewed by the facilitating company or by designers of the facilitating company. If a participant's original or custom artwork is selected, custom items, including custom postage would be designated as collectable and offered for sale to the general public. The organization that originally conducted the fundraiser relevant to the particular selected piece of original or custom artwork will then receive a portion of the proceeds of the sales to the general public. In addition, the artist responsible for the original or custom artwork may be eligible to receive a scholarship.

This embodiment of the present invention also contemplates selecting one or more original or custom artwork images to appear on custom postage, the images being relevant to the particular cause for which the fundraiser is being conducted.

Access to the above-described facilitating company's website can be free with the registration of new custom postage each year, and/or a fee can be charged for yearly registration.

In another embodiment, the present invention is directed in one aspect to a method for capturing a child's or other person's mental and creative development with a systematic process of conducting programs on a regular basis (annually, semi-annually or more or less frequently) whereby creative works generated by the individual are converted into commemorative prints.

To conduct a program, an organization such as a school, non-profit entity, a church, club, or the like, contacts a company or other entity (hereinafter referred to as the facilitating entity) that will facilitate the conduct of the program. The facilitating entity may distribute forms upon which the participant's creative works are positioned. The phrase "creative works" should be broadly construed herein to include, but not be limited to, drawings, paintings, poems, stories, essays, collages, custom postage, artwork, photographs, images and the like. In addition, "positioning the creative works on the forms" should be broadly construed to include drawing and/or painting directly onto the form, writing directly on the form, gluing, taping, or otherwise fastening items, drawings, paintings, and or writings onto the form. While the use of forms upon which to create or otherwise affix the above-described creative works onto have been described herein, the present invention is not limited in this regard as the creative works can be produced on paper, or electronically on a computer without departing from the broader aspects of the present invention.

In order to conduct the above-described program, the facilitating entity can also solicit the organization desiring to conduct the program. This solicitation can take the form of phone calls, faxes, e-mails, regular mail, combinations thereof, and the like. The facilitating entity can also employ a website through which information about the program can be one or more of observed, downloaded, and/or requested. In addition, the website may provide means therein by which the facilitating entity can be contacted. The website may also have advertising thereon. The advertising can take the form of banner-type ads on the website or these advertisements can be in the form of links to an advertiser's website. The facilitating entity can charge a fee to the advertisers for allowing the advertisements on the above-described website. While the facilitating entity has been described as contacting the organization, the present invention is not limited in this regard as the organization can also initially contact the facilitating entity.

Once an organization or other entity decides to conduct a program, the facilitating entity can provide the organization with forms as well as with instructions for conducting the program. In lieu of providing the organization with instructions and/or forms, these items may be made available to the organization via download from the internet. This download can be accomplished via the above-described website or some other site. The organization may accomplish downloading the forms and/or instructions, or participants in the program may be given instructions regarding how to download the forms themselves.

Once the participants are in possession of the forms, they then can position their creative works thereon. Once this is accomplished, the forms can be returned to the organization for which the program is being conducted, and the organization can forward the completed forms to the facilitating entity or an entity acting on behalf of the facilitating entity. While forms have been described as being provided in hard-copy or downloadable format, the present invention is not limited in this regard. The program described herein can be conducted without the use of forms. The creative works can also be generated on media, such as paper, cardboard, plastic and the like. The creative works can also be generated electronically and forwarded electronically to the facilitating entity. Once received by the facilitating entity, or other entity acting on behalf thereof, the creative works that are not in an electronic form are scanned into a database. The database and software associated therewith allow for the entry of information regarding the organization and participants for which the program is being conducted and also allows for each creative work to be matched to the appropriate participant and organization for tracking purposes. In lieu of forms, the facilitating entity may provide the organization and/or participants in the program with information regarding acceptable sizes and content regarding the creative works.

In an embodiment of the present invention, the creative works are posted on a web site accessible by the participants or others wishing to purchase copies of one or more creative works. The web site may contain password protection or other security protocols that would limit access to images relevant to a particular user and/or to a particular organization.

In another embodiment, the participant can customize the commemorative print by selecting a border or other embellishment such as text or clipart and the like to be placed on the creative work. This selection may be accomplished by picking the embellishment from printed images. Similarly, the participant may also be able to access his/her creative work via the above-described website and choose the embellishment from a listing of the embellishments on the website. The participant, via programming associated with the website, may also be able to view his/her creative work having the embellishments thereon, on the website.

The participant can use a software tool to adjust the creative work, for example by rotating the creative work and or adjusting the color and/or contrast of the creative work.

During the conduct of the program and preferably for a period of time thereafter, orders for the commemorative prints will be taken. Orders can be solicited by the organization, other individuals and/or the participants in the program. These orders may be accomplished, with or without an order form. Orders can be submitted to the facilitating entity or another entity, if so designated, acting on behalf of the facilitating entity. Order submission can be accomplished by submitting order information by phone, fax, mail, e-mail, and the like. In addition, in an embodiment of the present invention, the orders may be taken online via the above-described website or another site. When taken online, order information can be automatically saved in the content database and associated with the participant, and/or the particular organization. In order to facilitate ordering, information identifying a particular creative work can be submitted to the appropriate entity with the order. This information can take the form of indicia identifying the participant, such as the participant's name, the organization's name, a barcode, and the like.

When, or soon after, an item(s) is ordered, payment for the item(s) needs to be made. Payment can be made in any conventional manner, such as by cash, check, credit card, money order, and the like. Payment may also be made over the internet or by using a web-based payment site such as, but not limited to PayPal®. Once orders are received, the commemorative prints can be created. The commemorative prints can be printed by the facilitating company or an entity acting on behalf of the facilitating entity. Once generated, the commemorative prints can be distributed to the purchasers. Distribution can be accomplished by forwarding all of the ordered commemorative prints to the organization, forwarding the commemorative prints to the participants, forwarding the commemorative prints to the purchasers, or combinations thereof. In addition, the present invention contemplates using printers located at various locations or loaned, rented or sold to the organization, whereby printing materials can be supplied to the organization and subsequent to the supply by or on behalf of the facilitating entity, the commemorative prints can be generated on site.

In addition to the commemorative prints, other items bearing the creative work can also be provided. These items include such things as, but are not limited to, plaques, note cards, postcards, mugs, plates, key chains, wrapping paper, gift bags, and the like.

The above-described programs can also be thematic, with the creative works being directed to particular subject matter. For example, the themes can be, but are not limited to self-portraits, family, vacation, dreams, "what I want to be when I grow up", favorite sports, holidays, favorite songs, favorite color, books, and the like. The themes can also be directed to an individual's beliefs. The creative works can be directed toward gaining insight into a participant's perspective at the particular time in the participant's life when the program is conducted.

In one embodiment the above-described themes can be directed to the answers to one or more questions, such as, but not limited to:

If I had a million dollars I would __________?
I want my car to look like __________?
I'm happiest when __________?
If I were President I would __________?

In another aspect of the present invention, a collection of previously created creative works commemorative prints are made available to combine into a collage. The images from past programs can be posted on the above-described or another website where a user can arrange them into a collage. The user can be given the option of choosing to only include some of the creative works unique to a particular individual in the collage, or all of the individual's creative works. Alternatively, a person or entity desiring to purchase a collage may choose a number of creative works of an individual and the facilitating company creates the collage. In still another embodiment of the present invention, a purchaser can choose the creative works of several different individual's to create the collage. This can occur, for example, when a purchaser has more than one child participating in the program, or where it is desired to have a group of different children's creative works made into a collage, such as, for example, when all of the children are in the same class together. The collages can also be specific to particular classes, such as, but not limited to, language arts or geography. Upon a child's or individual's graduation or exit from an organization, school, or other institution, the facilitating entity may on its own or upon a request from the organization create a collage of the creative works stored in the database for the particular individual.

In another embodiment of the present invention, the creative works can be collected and compiled into book form. Portions of the book can be provided for persons to insert comments, photographs and the like. These comments, photographs, etc. can be inserted by the facilitating entity, or by the persons themselves either electronically via the above-described website or manually once the book is received. In addition, the present invention also contemplates an "events" area following one or more of the creative works in the book. In the events area, information can be inserted concerning the individual, and/or information concerning the program, an individual's perspective, local, national, and/or international events that took place at the time that a particular creative work was generated. Instead of a book, the creative works can be compiled into the form of a calendar.

The above described book, calendar, and/or collage can be stored in the content database so that for a period of time, one or all of the book, calendar, collage and commemorative prints can be purchased. In addition, they may also be viewed on a website and/or webpage cooperable with the content database. A subscription fee can be charged for the maintenance of the website and/or web page. A yearbook is also contemplated by the present invention. The yearbook can include the entire body of creative works generated by an organization or a portion thereof. For example, where the organization is a school, the yearbook could be a compilation of creative works for the whole school, a single grade, or a single classroom. In addition, the yearbook can also span several programs over a period of years. The creative works can also be subject to judging with certain chosen works being highlighted in the book.

In another embodiment of the present invention, a participant can be given a web-page unique to him/her upon which the participant's creative work can be displayed along with, but not limited to biographical or other information relevant to the participant, as well as a photograph of the participant. The participant may also be given the ability to post other information and/or creative works on the webpage. This additional information would be subject to the approval of the facilitating company. In addition, the entry to the above-described web page can require entry of a password or other security protocol. While a photograph of the participant has been described, it is not requisite that it appears on the website. The website can also include advertising thereon. The advertising can take the form of banner ads, and/or links to other websites. The website may also identify via information, advertisements and/or links for charities chosen by the individual, the facilitating entity or both. The facilitating entity may collect donations for or on behalf of the charity or via a link on the website, the charity can be accessed directly.

In still another embodiment, the above-described program could be run in conjunction with an annual photograph program such as is done in schools. A participants photograph along with the above-described creative work could be supplied together and/or be included on the same media. For example, the creative work and photograph could be presented side-by-side on the same media. Alternatively, the creative work could be presented on one side of the media and the photograph on the other.

In yet another embodiment, the present invention is directed in one aspect to a method for capturing a child's or other person's mental and creative development with a systematic process of conducting programs on a regular basis (annually, semi-annually or more or less frequently) whereby creative works generated by the individual are converted into commemorative prints.

In some embodiments, materials for creating the above-described original or custom artwork are provided in a kit. These kits would be purchased through retail outlets or online. The kits can be used in conjunction with fundraising events and/or for retail sales not involving fundraising events. In one embodiment the seller of the kits donates a portion of the proceeds to one or more charities or designates a portion of the proceeds to a charity of a purchaser's choice. As will be explained in detail below, the kits can be customized for particular genders and age groups. Each kit will contain at least one, and preferably several artforms upon which a user can create original artwork. Each artform will have an areal portion thereon into which the artwork should be positioned. As will be explained in greater detail below, an order form is provided for ordering a quantity of custom postage. The order form can be combined with the artform and encompass a separate areal portion of the form, or it can occupy a reverse side of the artform.

At least one shipping receptacle is provided for forwarding one or more of the artforms having the original artwork thereon, and a completed one of the order forms, to a facility for processing the custom postage orders. Preferably, the shipping receptacle is a self-addressed prepaid envelope. However, the present invention is not limited in this regard as a box or other acceptable container can be employed without departing from the broader aspects of the present invention. Moreover, the receptacle may not be postage prepaid.

Instructions for using the kit, including instructions directed to creating the original artwork and for completing the order form, are also provided in the kit. These instructions can be provided in different media or combinations of media. For example, the instructions could be of the traditional paper type, on CD, DVD or video, or combinations thereof. Furthermore, the instructions can also include an explanation of how custom postage can be used as part of a fund raising event.

Depending on a type of kit, the materials contained therein can vary. For example, in one embodiment of the present invention, the kit is directed to newborns and infants whereby the customized item comprises custom postage incorporating the child's handprint and/or footprint. In such a kit, an inkpad of a size appropriate to accommodate the child's hand and foot is provided as part of the supplied materials. The child's hand and/or foot can be applied to the inkpad, transferring ink thereto, and then the hand or foot is pressed against the appropriate areal portion of the artform to create the handprint or foot print. The kit for this embodiment of the present invention can also be gender specific. For example, a blue inkpad could be supplied for a kit directed to males and a pink inkpad could be supplied to a kit directed to females. Alternatively, the newborn kit can be supplied with both a pink and a blue inkpad or a single inkpad can be bifurcated with a blue portion and a pink portion. This will allow for a single kit to be gender neutral and accommodate either a male or female newborn. However, the present invention is not limited in this regard as other materials more closely associated to one gender rather than the other could be provided in gender specific kits.

Depending on the age of the user of the kit, different types of materials may be supplied. For instance, kits directed to younger artists may include, but are not limited to, such materials as crayons, colored pencils, markers, water paints and the like. In addition, these kits may also include predrawn designs on the artforms that the artists can simply color in.

Kits directed to older or more advanced artists can include, but are not limited to, oil paints and paint brushes, pastels and charcoals, etc. In addition, the materials can also include such things as stickers, tape, stamps and stamp pads, colored paper, tape, glue, rulers and scissors.

In one embodiment, on-line tools, the artforms and/or the materials for creating the original or custom artwork are provided on-line so that the original or custom artwork can be created on-line by a user, via a computer. For example, the user can access a website by entering an access code to gain access to the website. The website includes software programs that simulate, drive and allow the user to manipulate icons of the tools, the artforms and/or the materials for creating the original or custom artwork on-line. The on-line tools, the artforms and/or the materials for creating the original or custom artwork on-line include, but are not limited to, on-line forms of paints, paint brushes, crayons, markers, color palettes (e.g., a display of a complete range of colors made available by a computer graphics card, from which the user or a computer program may choose those to be displayed), shapes, graphics and images. The website includes a catalog of the on-line tools, the artforms and/or the materials for creating the original or custom artwork, for selection by the user.

In addition to age and gender specific kits, kits can also be directed to specific themes and events such as, but not limited to, holidays, birthdays, weddings, anniversaries, sports, animals, cars etc.

While the kits have been thus far described as being directed to the generation of customized items such as custom postage, the present invention is not limited in this regard. In addition to custom postage, the kits can also include forms for ordering such things as keychains, postcards, envelopes, notecards, mugs, T-shirts, and other items that would bear an image of the original or custom artwork thereon. As will be explained in detail below, once an order is forwarded to the processing facility, the order will be fulfilled, and the items embodying the order subsequently shipped to the purchaser.

To fulfill an order, the artform having the original or custom artwork thereon as well as a completed order form is positioned in the provided envelope along with payment instructions and forwarded to the processing facility. With respect to payment instructions, the kit may have a certain amount of custom postage included in the purchase price of the kit. Regardless, the order form of the present invention includes an area where payment information, such as credit card information, can be specified. In addition, a purchaser will specify the amount of custom postage desired as well as any other items they may desire to order.

Upon receiving the completed order forms and artforms, the processing facility processes the payments pursuant to the information provided on the order forms. Payment can be made, or authorized to be made by any number of different methods. For example, payments can be made by credit card, or by using an internet based payment service, such as, for example, PayPal®. In addition, it is contemplated that payment can be made via check, cash or money order. In any instance where the processing facility is unable to process payment, the entity making payment will be contacted for resolution.

Once payment has been processed, the completed artforms are scanned into a database. Preferably, a high speed scanner is employed to accomplish this task. The scanned information is parsed and appropriately entered into the database. This information includes, but may not be limited to, the image on the artform, any barcode information associated with or on the artform or order, and initial order information. In addition, some or all of the information may be manually entered. Manual entry may be accomplished twice for each piece of data. When this is done, two different people each enter the same information. If a discrepancy is discovered, the information is checked and the discrepancy is resolved. Checking information obtained from the artforms may also be accomplished electronically. Once the accuracy of the scanned or otherwise input information, including the artwork is verified, a unique identification code can be generated for and associated with the information pertaining to each artform submission.

The unique participant identification code may be used to create a unique URL and code that a purchaser may access to order or reorder custom postage or other items pertaining to the artwork associated with the particular artwork to which the URL pertains.

The artform provided with the kit can include a barcode thereon. The barcode can serve a number of purposes. It can, once scanned, identify the kit type the artform was provided in. The image on the artform can be associated with the barcode at the processing facility to provide a means of identifying and archiving the particular image.

Prior to printing the custom postage, a final check may be performed. Any artwork that is inappropriate or for some other reason is deficient such that printing is not advisable will be returned and a refund for any moneys paid will be processed. Once the final check is performed, any approved artwork will then be printed as custom postage. In one embodiment the custom postage is in stamp-like form, adhesively backed, and will be provided on sheets with a predetermined number of pieces of custom postage per sheet. Once printed, the custom postage is mailed directly to the purchasers. In another embodiment the postage is imprinted on an envelope or postcard and no adhesive is used or necessary. The postage can be of any denomination, including standard delivery and express options. In addition, the postage can be of any size depending on preferences of the artist, photographer or designer or as governed by predetermined specifications.

The present invention also contemplates purchasers having the ability to further customize the custom postage they purchase by being able to customize the colors of the printing corresponding to postage amount and any other printing on the postage, as well as borders around the postage. Methods for accomplishing this are disclosed and claimed in U.S. patent application Ser. No. 11/098,807, the disclosure of which is incorporated in its entirety herein by reference. To customize these colors, a user accesses a website where an image of the custom postage can be displayed and associated with a program operable to accomplish the above-referenced color customization. Once the image of the custom postage is displayed, a user selects any color on the image by pointing to it and "clicking" using a mouse or other pointing device. Once selected, that color is reproduced in the postage areas of the custom postage. In addition, the program can also generate a palette of selectable colors that are complementary to the color selected with appropriate and necessary level of contrast. Once the palette is generated, one or more of the colors thereon can be selected to customize the textual portion of the postage area.

Purchasers can also be given the option of further personalizing the custom postage by specifying a label or title that will be input by the facility processing the custom postage so that the label or title appears on the custom postage image. The title or label can be limited to a maximum number of characters. In addition, a purchaser may have the option of choosing font, font size, color, and the styles by which the title or label will appear on the custom postage. For example, a purchaser may want to have text appear in a text balloon. Moreover, the purchaser can also determine a denomination and/or a physical size of the postage that is ordered.

Figure 1:
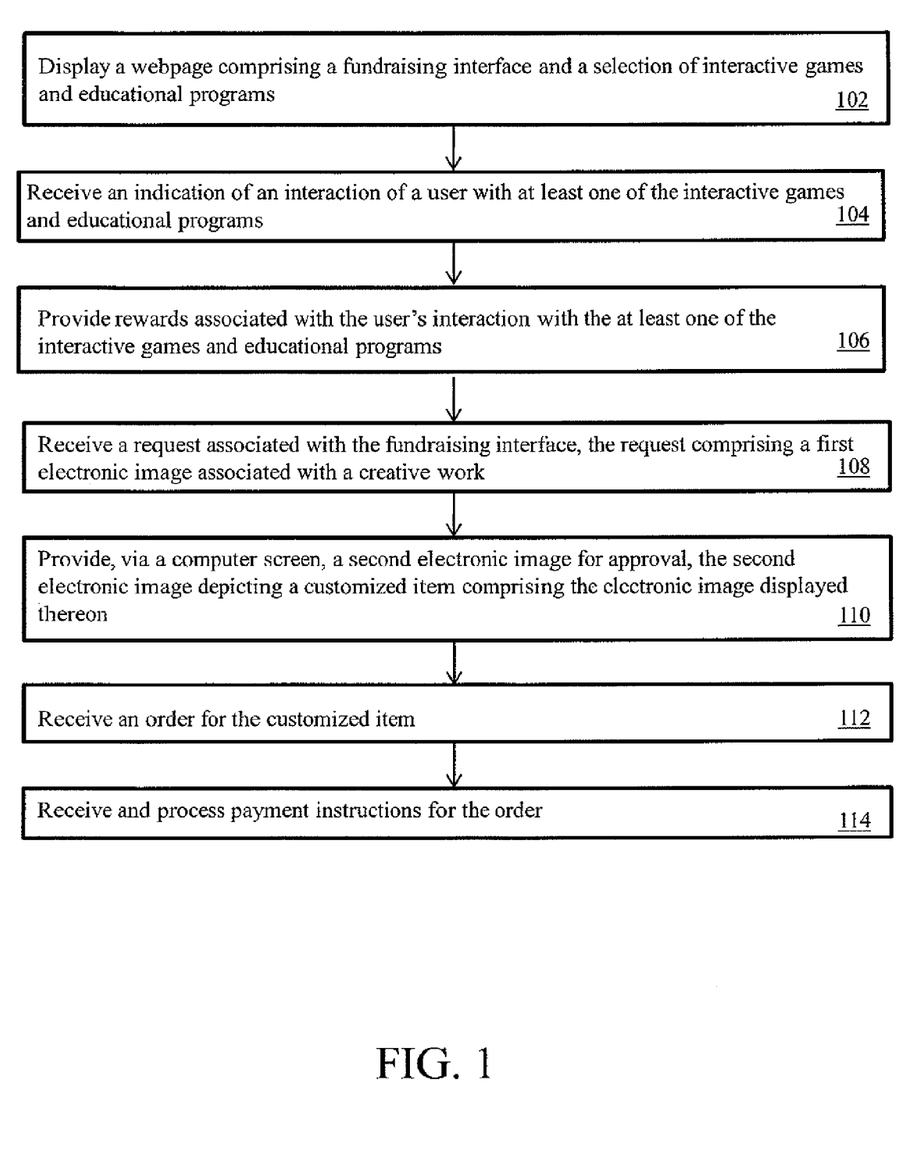
FIG. 1 illustrates a method according to some embodiments.

Now referring to FIG. 1, a method is disclosed. At 102, a webpage comprising a fundraising interface and a selection of interactive games and educational programs is displayed. The webpage may be displayed by a processor, such as processor 202 of FIG. 2, on a display such as display 208 of FIG. 2. At 104, an indication of an interaction of a user with a least one of the interactive games and educational programs is received. The indication is received at a computer, such as computer 200 of FIG. 2. The indication may comprise one or more communication packets that are associated with an identification of the user and/or an identification of an interactive game or educational program that the user is interacting with.

Next, at 106, rewards that are associated with the user's interaction with the at least one of the interactive games and educational programs are provided. The rewards are provided to the user. In one embodiment, the rewards comprise points to be redeemed for merchandise. In an alternate embodiment, the rewards comprise credits to be redeemed for tuition at an institution.

The webpage comprises a fundraising interface. A request associated with the fundraising interface is received at 108. The request comprises a first electronic image associated with a creative work. Next, at 110, a second electronic image is provided via a computer screen for approval. The second electronic image depicts a customized item comprising the electronic image displayed thereon. In some embodiments, the second image is accessible only via notice from or on behalf of an organization associated with a fundraiser.

At 112, an order for the customized item is received. Once the organization has had the opportunity to view the customized items, orders are received including payment instructions. At 114 payment instructions are received and processed for the order. Following processing of payment, the orders are fulfilled and the customized item is delivered to a purchaser thereof either directly or via distribution by the organization conducting the fundraiser. At a conclusion of the fundraiser, a portion of the proceeds will be due the organization. Software associated with a database can be used to extract the information therefrom relevant to the amount due the organization and can be employed to generate a report pertaining thereto.

Figure 2:
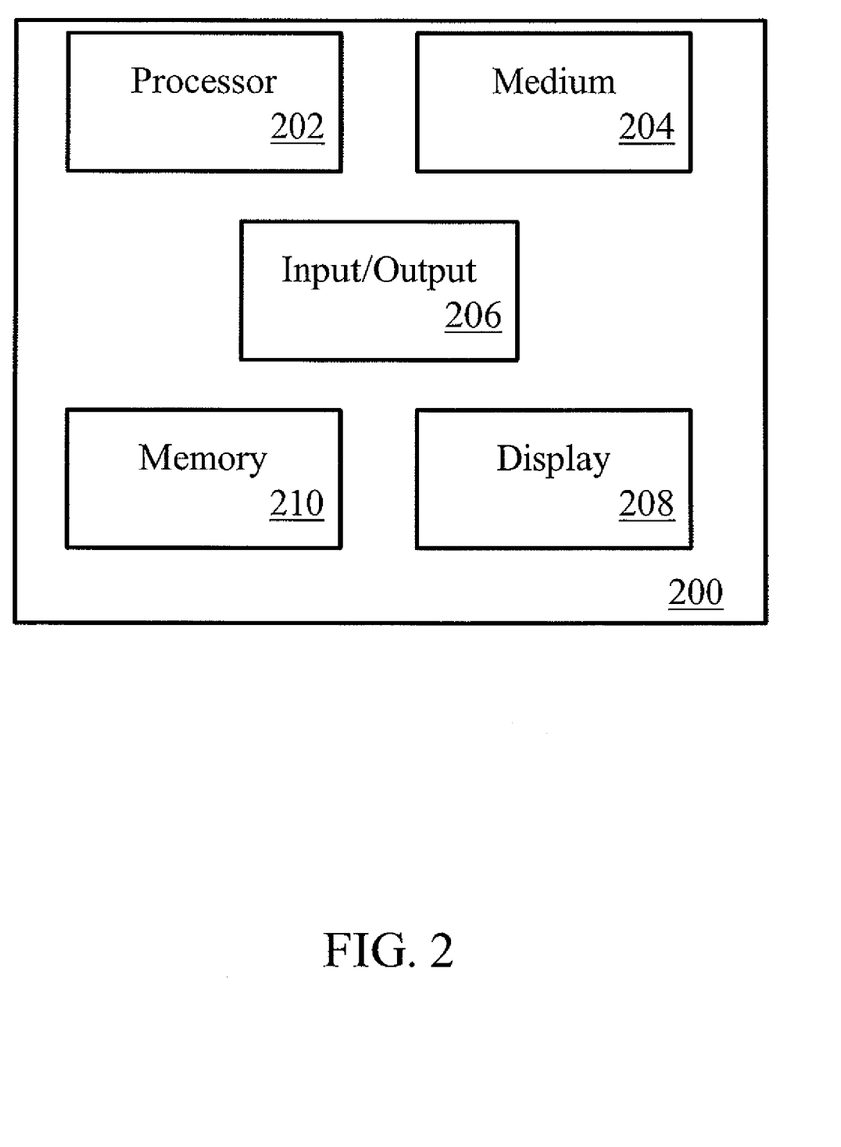
FIG. 2 illustrates an apparatus according to some embodiments.

Now referring to FIG. 2. An apparatus 200 is illustrated. The apparatus 200 may comprise, but is not limited to, a desktop computer, a server, a cell phone, a laptop, or a personal data assistant. The apparatus 100 comprises a processor 202, a medium 204, an input/output device 206, and a display 208.

The medium 204 may comprise any computer-readable medium that may store processor-executable instructions to be executed by the processor 202. For example, the medium 204 may comprise, but is not limited to, a compact disk, a digital video disk, flash memory, optical storage, random access memory, read only memory, or magnetic media. The processor 202 may include or otherwise be associated with dedicated registers, stacks, queues, etc. that are used to execute program code and/or one or more of these elements is shared there between.

The memory 210 may store, for example, applications, programs, procedures, and/or modules that store instructions to be executed. The memory 210 may comprise, according to some embodiments, any type of memory for storing data, such as a Single Data Rate Random Access Memory (SDR-RAM), a Double Data Rate Random Access Memory (DDR-RAM), or a Programmable Read Only Memory (PROM).

The input/output device 206 may comprise any port that allows peripheral devices or external elements to be connected to the apparatus 100. The input/output port may comprise, but is not limited to, a universal serial bus (USB) port.

The display 208 may display alphanumeric characters and graphics. The display 208 may comprise a plurality of backlight lamps such as, but not limited to, a LCD display.

Although this invention has been shown and described with respect to the detailed embodiments thereof, it will be understood by those of skill in the art that various changes may be made and equivalents may be substituted for elements and steps thereof without departing from the scope of the invention. In addition, modifications may be made to adapt a particular situation to the teachings of the invention without departing from the essential scope thereof. Therefore, it is intended that the invention not be limited to the particular embodiments disclosed in the above detailed description, but that the invention will include all embodiments falling within the scope of the above description.

What is claimed is:

1. A method for offering custom postage as part of a fundraising event, said method comprising the steps of:
   providing a computer having a processor programmed to establish a database for storing data, the processor including software based programming to enable the processor to manipulate data in the database;
   providing a display in communication with the processor;
   receiving an inquiry from, or on behalf of, an organization regarding offering the custom postage as part of said fundraising event;
   establishing said fundraising event by displaying on the display a webpage comprising a fundraising interface and a selection of interactive games and educational programs;
   collecting initial information from said organization and storing said initial information in said database;
   receiving via the processor, an indication of an interaction of a user with the interactive games and the educational programs;
   causing said software based programming to cause said computer to generate a unique organization identification code and to associate said unique organization identification code with said initial information stored in said database;
   causing said software-based programming to cause said computer to extract relevant information from said database and to generate artforms upon which participants in said fundraising event can create artwork, said artforms having said unique organization identification code associated therewith;
   distributing a plurality of said artforms to said organization and thereby to said participants;
   receiving payment information relevant to purchasers of said custom postage and processing payments therefore;
   entering into said database images of artwork from a plurality of said artforms, the artwork having been provided by said participants, information relevant to said orders and information identifying each of said participants;
   said software-based programming causing said computer o cause said images of said artwork, said information relevant to said orders and said information identifying each of said participants to be associated with one another and with the relevant organization identification code;

causing said software based programming to cause said computer to generate a unique participant identification code for each participant and to associate said participant identification code with, the information stored in said database relevant to said participant, and with the relevant organization identification code;

causing said software-based programming to cause said computer to manipulate said data stored in said database to generate printing information for said custom postage;

using said printing information to print said custom postage;

shipping said printed custom postage to said purchasers thereof; and providing rewards associated with the user's interaction with the interactive games and the educational programs.

2. The method of claim 1, wherein the rewards comprise points to be redeemed for merchandise.

3. The method of claim 1, wherein the rewards comprise credits to be redeemed for tuition at an institution.

4. The method of claim 1, wherein a denomination of the custom postage is selected by the user.

5. The method of claim 1, wherein a physical size of the custom postage is selected by the user.

6. The method of claim 1, wherein the custom postage is printed on a postcard.

7. The method of claim 1, wherein the custom postage is printed on an envelope.

8. The method of claim 1, further comprising:
receiving a registration from the user, the registration associated with the custom postage and comprising an indication of a state or the United States of America in which the user resides.

9. The method of claim 8, wherein the at least one of the interactive games and educational programs comprises a pen pal program and the registration is associated with the pen pal program.

10. The method of claim 9, wherein the pen pal program comprises:
receiving a selection of a first custom postage associated with a recipient residing in a first state of the United States of America;
receiving text to be sent to the recipient;
sending an e-mail based on the received text to the recipient; and
providing rewards to the user, the rewards associated with sending the e-mail.

11. An apparatus comprising:
a processor;
a display in communication with the processor;
the processor being programmed to establish a database for storing data,
a computer-readable medium comprising processor-executable instructions, that when executed by the processor perform a method, the method comprising:
receiving an inquiry from, or on behalf of, an organization regarding offering custom postage as part of a fundraising event;
establishing said fundraising event by displaying on the display a webpage comprising a fundraising interface and a selection of interactive games and educational programs;
collecting initial information from said organization and storing said initial information in said database;
receiving via the processor, an indication of an interaction of a user with the interactive games and the educational programs;
causing said computer-readable medium to cause said computer to generate a unique organization identification code and to associate said unique organization identification code with said initial information stored in said database;
causing said computer-readable medium to cause said computer to extract relevant information from said database and to generate artforms upon which participants in said fundraising event can create artwork, said artforms having said unique organization identification code associated therewith;
distributing a plurality of said artforms to said organization and thereby to said participants;
receiving payment information relevant to purchasers of said custom postage and processing payments therefore;
entering into said database images of artwork from a plurality of said artforms, the artwork having been provided by said participants, information relevant to said orders and information identifying each of said participants;
said computer-readable medium causing said computer to cause said images of said artwork, said information relevant to said orders and said information identifying each of said participants to be associated with one another and with the relevant organization identification code;
causing said computer-readable medium to cause said computer to generate a unique participant identification code for each participant and to associate said participant identification code with, the information stored in said database relevant to said participant, and with the relevant organization identification code;
causing said computer-readable medium to cause said computer to manipulate said data stored in said database to generate printing information for said custom postage;
using said printing information to print said custom postage;
shipping said printed custom postage to said purchasers thereof; and
providing rewards associated with the user's interaction with the interactive games and the educational programs.

12. The apparatus of claim 11, wherein the rewards comprise points to be redeemed for merchandise.

13. The apparatus of claim 11, wherein the rewards comprise credits to be redeemed far tuition at an institution.

14. The apparatus of claim 11, further comprising:
receiving a registration from a user, the registration associated with the custom postage and comprising an indication of a state of the United States of America in which the user resides.

15. The apparatus of claim 11, wherein at least one of the interactive games and educational programs comprises a pen pal program and the registration is associated with the pen pal program.

* * * * *